Jan. 4, 1966 H. C. TALCOTT 3,227,813

ELECTRONIC RINGING ARRANGEMENTS IN TELEPHONE SYSTEMS

Filed July 31, 1962 2 Sheets-Sheet 1

INVENTOR.
HORACE C. TALCOTT

BY C. A. Gulbrandsen

ATTY.

Jan. 4, 1966 H. C. TALCOTT 3,227,813
ELECTRONIC RINGING ARRANGEMENTS IN TELEPHONE SYSTEMS
Filed July 31, 1962 2 Sheets-Sheet 2

INVENTOR.
HORACE C. TALCOTT
BY C. A. Gulbrandsen
ATTY.

United States Patent Office 3,227,813
Patented Jan. 4, 1966

3,227,813
ELECTRONIC RINGING ARRANGEMENTS IN TELEPHONE SYSTEMS

Horace C. Talcott, Downers Grove, Ill., assignor to Automatic Electric Laboratories, Inc., Northlake, Ill., a corporation of Delaware Filed July 31, 1962, Ser. No. 213,720
4 Claims. (Cl. 179—84)

This invention relates to signalling arrangements, particularly to voice-frequency controlled electronic signalling arrangements, for use in telephone systems.

Previous circuits have been designed to provide tone signalling in electronic systems, such as using an amplifier at the subset to amplify the signal transmitted to the subset over the subscriber line. In my copending application, Serial No. 845,802, filed October 12, 1959, now U.S. Patent 3,065,307, I disclose a signalling system in which a signalling arrangement at the subset is controlled by the reversal of the direct current polarity of the line at the central office.

The object of the present invention is to provide a novel and improved signalling arrangement of the type which is powered from a direct current source at the central office and is controlled from that office.

In the embodiments of the invention described below, a voice-frequency input signal of one frequency controls a signalling arrangement, which in turn produces a frequency that may be independent of the control signal frequency and level. An advantage of these arrangements is that the circuit parameters governing the output tone can be chosen to obtain the best efficiency with respect to the acoustic characteristics of the sound transducer. The telephone receiver, for reasons of economy and convenience, can be utilized as the output sound transducer.

Other features of the invention will become apparent and the invention will best be understood by referring to the following description and the accompanying drawings.

Figure 1:
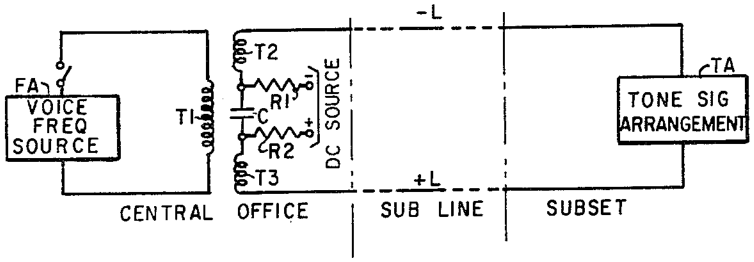
FIG. 1 is a schematic representation of a single frequency signalling sytem including a signalling arrangement, such a described herein.

Generally speaking and according to FIG. 1, the signalling system could be made up of a central office that is equipped with a source of direct current and apparatus FA for generating a low power voice frequency current. The direct current source is connected to the subscriber line by way of resistors R1 and R2 and by transformer windings T2 and T3. The voice-frequency current is coupled to the subscriber line by way of transformer windings T1, T2 and T3. The subscriber line is also connected to a telephone subset and its associated signalling arrangement TA.

Figure 2:
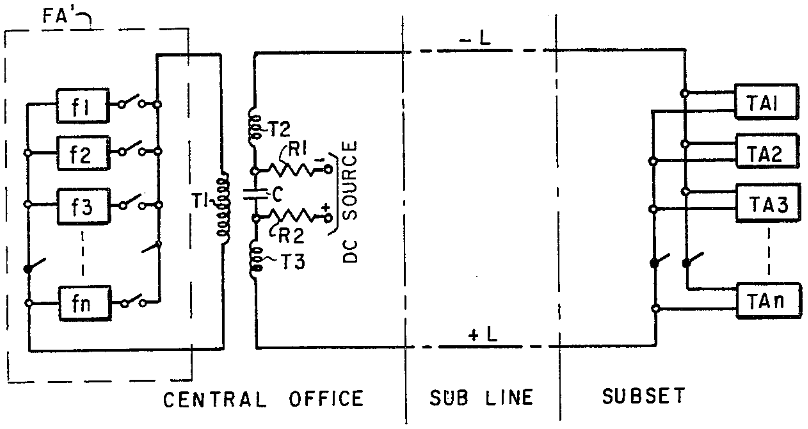
FIG. 2 is a schematic representation of a multi-frequency signalling system including a plurality of such arrangements.

A similar sgnalling system, such as represented in FIG. 2, may be used for multi-party selective ringing with each signalling arrangement tuned to a different control frequency. Such a system could consist of a central office with a source of direct current and apparatus FA′ for generating a plurality of voice-frequencies $f_1, f_2, f_3 \ldots fn$. The direct current source and the apparatus FA′ could be connected and coupled to the subscriber line, as stated above. The subscriber line is connected to a plurality of telephone subsets. Each subset would have a signalling arrangement TA1, TA2, TA3 . . . TA*n*, each tuned to operate only by the respective frequencies $f_1, f_2, f_3 \ldots fn$.

Briefly, the embodiments of the invention shown herein employ the basic Colpitts oscillator circuit to provide an audible tone by way of a sound transducer. The oscillator circuit is powered from the central office direct current source over the subscriber line. The control bias for the oscillator is derived from a low power signal transmitted over the subscriber line from the central office. The resonant circuit shown in each of the embodiments are tuned to resonate at only one frequency and can adapt the arrangement to frequency selective signalling, if each one of a plurality arrangement is tuned to a different frequency.

Figure 3:
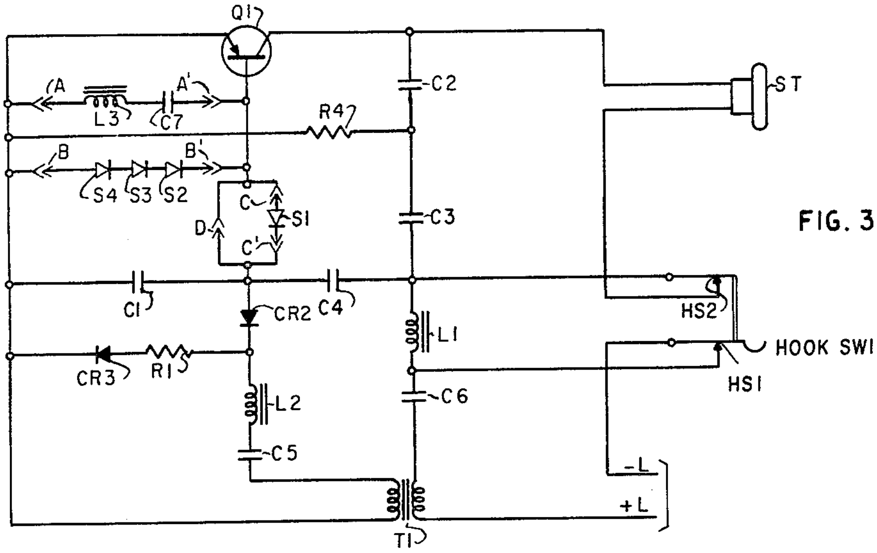
FIG. 3 is a circuit diagram showing one embodiment of the present invention in which the converted voice-frequency signal is used to supply the operating bias.

Referring to FIG. 3, the arrangement is connected to the subscriber line by way of terminals +L and −L. When the circuit is idle, there is no operating bias on transistor Q1, its base being returned to its emitter through diode CR2, resistor R1 and diode CR3.

A ringing control signal received over the line flows through the primary of transformer T1. Inductor L1 blocks this signal current from interfering with the oscillator circuit and prevents the current from being shunted through condensers C1 and C4. Inductor L2 and condenser C5 resonate the secondary current of transformer T1. The negative half-waves are rectified by diode CR2 and filtered by condenser C1 to provide operating bias and stable oscillation respectively. The positive half-waves pass through resistor R1 and diode CR3 to provide an alternating current load for the resonant circuit. Transistor Q1, now supplied with operating bias, will conduct and by way of example, will cause the tank circuit made up of condenser C2, condenser C3 and sound transducer ST to oscillate at a frequency of say, 2200 c.p.s.

The "ringer' will sound as long as the tone remains on the line and will follow the interruptions of the desired pattern. If strap A—A′ is used, the oscillator will be self-quenching and the ring tone control interruptions are not necessary. The self-quenching feature has been previously shown by I. P. Kaminow in U.S. Patent 2,836,724.

If straps B—B′ and C—C′ are used, strap C—C′ replacing connection D, the arrangement will become more independent of the control signal level. S1–S4 are diodes known as Stabistors. Stabistors have a controlled forward "breakdown voltage" and are available in two values, .25 volt and .64 volt for germanium and silicon, respectively. As shown in the circuit diode S1 effectively blocks the control bias until about .25 volt is reached. At this point its resistance decreases rapidly with an increasing control signal level, tending to provide a switching type of control. Diodes S2–S4 are silicon Stabistors, and limit the bias to about 1.9 volts. The bias limiting action prevents the oscillator from being driven into non-linear operation, which in turn prevents distortion of the tone ringing sound.

By way of example, favorable results were obtained using the basic circuitory of FIG. 3 with component values as follows:

| | |
|---|---|
| R1 | 2700 ohms. |
| R4 | 27 ohms. |
| C1 | 1 micro-farad. |
| C2 | 0.35 micro-farad. |
| C3 | 1 micro-farad. |
| C4 | 0.50 micro-farad. |
| C5 | 0.22 micro-farad. |
| C6 | 0.30 micro-farad. |
| Q1 | 2N524, |
| CR2, CR3 | T12G, |
| L1 | 200 mili-henry. |
| L2 | 80 milli-henry. |
| T1 | Step-up 1:3,0.5 henry primary inductance. |

The design of T1 is academic and should be made to match the requirements of the oscillator and resonant circuit to those of the line.

Figure 4:
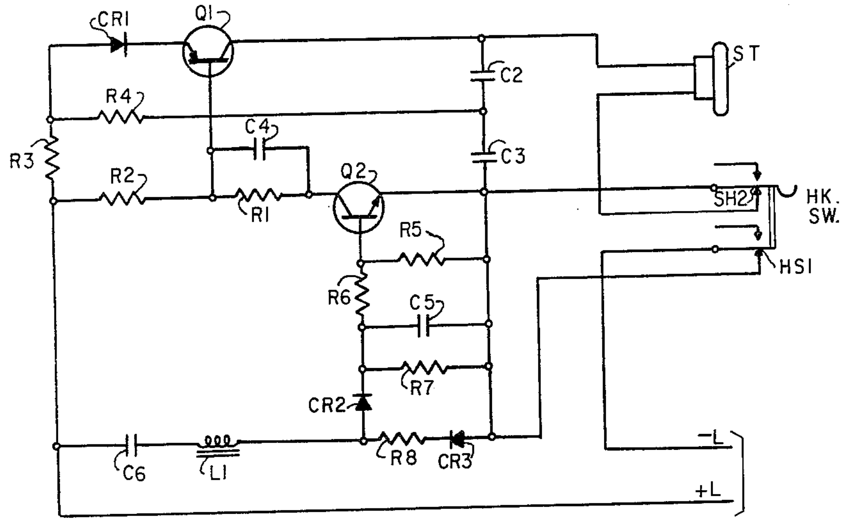
FIG. 4 is a circuit diagram of another embodiment of the invention having a transistor switch included in the control bias circuit.
Figure 5:
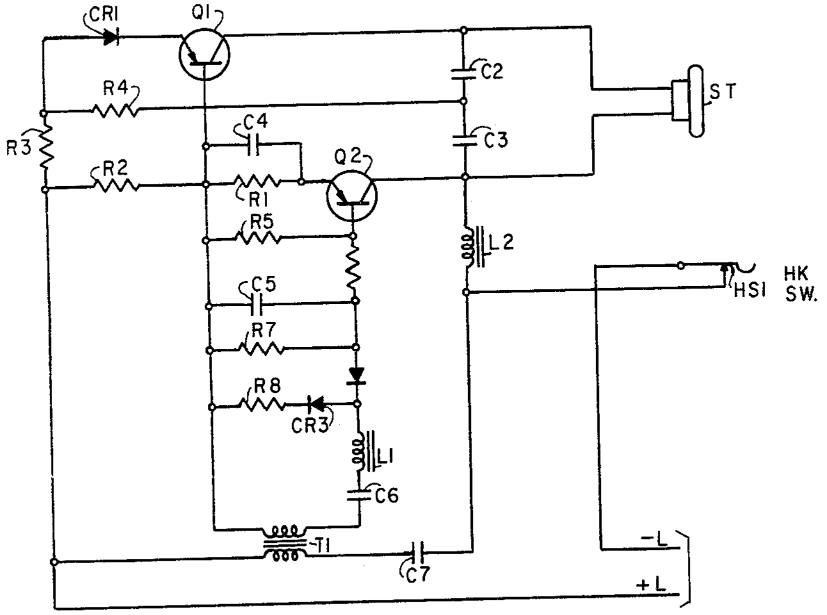
FIG. 5 is a schematic representation of still another embodiment of the invention that is similar in some respects to both FIGS. 3 and 4.

In the circuits shown in FIGS. 4 and 5 control is effected by mtans of a transistor switch in the bias circuit. In FIG. 2 an NPN transistor is used so that one side of the tone converter circuit can be common with one side of the line, thus eliminating the need for a transformer. However, in some cases it would be desirable to control the voltage sensitivity and a transformer would be necessary. In that case, that circuit of FIG. 5 would be preferred.

Referring to FIG. 4, bias is provided to the emitter of transistor Q1 from the +L side of the line by way of resistor R3 and diode CR1 and to the collector of the transistor from the —L side of the line by way of the hookswitch contacts HS1 and HS2 and the sound transducer ST. Transistor Q2 has bias supplied to its collector from the +L side of the line by way of resistors R2 and R1 and to its emitter from the —L side of the line by way of hookswitch contact HS1. During the idle condition, transistor Q2 is held effectively "off" by the near zero bias provided by the low base return resistor R5. However, a small collector-to-emitter leakage current does flow and tends to bias transistor Q1 "on." Diode CR1 is added in series with the emitter of transistor Q1. The small leakage current is not sufficient to drive the diode into conduction and the resulting voltage drop across the diode, supplementing the small reverse bias that is developed across resistor R3, provides reverse bias to the base of transistor Q1 through resistor R2. If the idle state line leakage is too high, one or more diodes can be connected in the emitter circuit of transistor Q2. However, the sensitivity of transistor Q2 would be decreased by the breakover voltage of the diodes.

The circuit operates somewhat similar to that of the circuit in FIG. 3. Inductor L1 and condenser C6 resonate the control signal, the proper half waves of which are rectified and filtered by diode CR2 and condenser C5. Resistor R8 matches resistor R7 and in conjunction with diode CR3 provides an effective A.C. circuit for the resonant circuit. Resistor R6 prevents excessive loading of the D.C. control supply and allows a constant current of a magnitude that is sufficient to saturate transistor Q2. The switching effect provided by transistor Q2 connects the bias circuit of transistor Q1 across the line. At this time operating bias is supplied from the line according to the ratio of resistors R1 and R2.

Referring to FIG. 5, the emitter bias of transistor Q1 is provided from the +L side of the line by way of resistor R3 and diode CR1 and collector bias is provided from the —L side of the line by way of hookswitch contact HS1, inductor L2, and the sound transducer ST. Emitter bias is supplied to transistor Q2 from the +L side of the line by way of resistors R1 and R2 and collector bias is supplied from the —L side of the line by way of hookswitch contact HS1 and inductor L2. During the idle condition transistor Q2 is nonconducting because of the reverse bias on its base through resistor R5 from the junction of resistors R1 and R2. However, the leakage current tends to bias transistor Q1 into conduction and the addition of diode CR1 provides degeneration at low currents to hold Q1 more effectively "off."

The circuitry of FIGS. 4 and 5 allows complete isolation between the control signal and the output tone signal. This feature provides good flexibility and reliability even though an additional transistor is required.

The operation of the arrangement, as can be seen in the drawings, is subject to the condition of the hookswitch. Signalling is therefore terminated when the signalled subset is answered.

The values in the above description are presented as illustrative examples. Applications other than shown in the specific embodiments should be evident to those skilled in the art and within the spirit and scope of the appended claims.

What is claimed is:

1. In a telephone system including a central office having a source of direct current and a source of low power voice frequency signal current interrupted in an on-off pattern, and a subscriber line, an arrangement connected to and powered over said line by said direct current source for generating an audible tone that is independent of said signal frequency, said arrangement comprising:

- an oscillator for generating said audible tone, said oscillator including a transistor having an input and an output, and a first resonant circuit having a sound transducer connected to said output of said transistor;
- a second resonant circuit coupled to said line, said second resonant circuit being tuned to said low power voice frequency;
- means connected to said second resonant circuit for rectifying and filtering said low power voice frequency signals and for isolating said signals from the input of said transistor; and
- means interposed between said rectifier and filter means and said input of said transistor for controlling the operation of said oscillator in accordance with said on-off pattern.

2. In a telephone system, the combination as claimed in claim 1, and further comprising means interposed between said first resonant circuit and said second resonant circuit for isolating the frequency of said first resonant circuit from said second resonant circuit.

3. In a telephone system, the combination as claimed in claim 1 wherein said oscillator control means includes diode means of the type having controlled forward breakdown voltage.

4. In a telephone system, the combination as claimed in claim 1, wherein said oscillator control means includes a transistor controlled voltage divider arrangement connected in shunt relation to said line.

References Cited by the Examiner

UNITED STATES PATENTS

| | | | |
|---|---|---|---|
| 2,824,175 | 2/1958 | Meacham et al. | 179—84 |
| 2,836,724 | 5/1958 | Kaminow | 331—117 |
| 2,850,650 | 9/1958 | Meacham | 179—84 |
| 2,957,950 | 10/1960 | Holman et al. | 179—84 |
| 3,026,377 | 3/1962 | Sullivan | 179—84 |
| 3,165,591 | 1/1965 | Flowers | 179—84 |

ROBERT H. ROSE, *Primary Examiner.*

WALTER L. LYNDE, *Examiner.*

H. BOOHER, J. W. JOHNSON, *Assistant Examiners.*